May 30, 1961 P. P. LUGER 2,986,697
AUTOMATIC ELECTROMETER SCALER
Filed June 23, 1958 4 Sheets-Sheet 1

*INVENTOR.*
PAUL P. LUGER
BY Toulmin & Toulmin
ATTORNEYS

May 30, 1961  P. P. LUGER  2,986,697
AUTOMATIC ELECTROMETER SCALER
Filed June 23, 1958  4 Sheets-Sheet 3

INVENTOR.
PAUL P. LUGER
BY Toulmin & Toulmin
ATTORNEYS

United States Patent Office 2,986,697
Patented May 30, 1961

2,986,697
AUTOMATIC ELECTROMETER SCALER
Paul P. Luger, % Seattle University, Broadway and Madison, Seattle, Wash.
Filed June 23, 1958, Ser. No. 743,948
18 Claims. (Cl. 324—68)

This invention relates to deflection instruments and more particularly to an improved method and means for the continuous recording of the phenomena measured by such instruments.

This application is a continuation-in-part of my former application Serial No. 343,994, filed March 23, 1953, and now abandoned.

In many deflection instruments, the force deflecting the movable element is an electrostatic force related to the potential difference between the movable element and a reference element. When the characteristics of such instruments make it desirable that the instrument be employed in the measurement of electric currents, it is necessary to measure the rate of deflection of the deflection element.

In particular, it is often desirable to use a quartz fiber electrometer in conjunction with an ionization chamber for radiation measurements. A well designed electrometer is sufficiently accurate to be employed as a secondary standard but requires operator observation of the rate of deflection of the electrometer needle. The need for operator observation has inhibited use of an electrometer for routine radiation measurements despite its other desirable characteristics.

It is, therefore, the primary object of my invention to provide an improved method and means for the automatic monitoring of the phenomena measured by a deflection instrument.

It is another object of this invention to provide a device in which the sensitivity of the instrument is automatically adjustable.

It is also an object of this invention to provide a device in which the sensitivity of the instrument is indicated in printed form in conjunction with radiation measurements.

It is a further object of my invention to provide a device in which a calibration potential is automatically applied to the same recording instrument from which is derived a printed record or a calibration curve for the purpose of comparison with the record of the phenomena observed.

These and other objects of the invention are practiced, generally speaking, by providing a deflection instrument having an element movable therein in accordance with the difference of potential between this element and a reference element also contained in the instrument. Associated with this instrument is a source of illumination and an optical system to focus a real image of the deflection element upon an opaque mask having at least one slit therein. A photoelectric cell is mounted behind the slit to generate a signal dependent upon movement of the deflection element. The signal generated by the photoelectric cell is employed to operate a control device to indicate and record the indication of the rate of change in the potential applied to the deflection element.

In another embodiment of my invention I have utilized the signal from a photoelectric cell to compare the rate of change of potential of the deflection element with a predetermined rate and to automatically change the sensitivity of the instrument if the predetermined rate is exceeded.

In a further embodiment of my invention I have provided means for the application of a potential to the deflection element having a predetermined rate of change in order, at periodic intervals, to continuously calibrate the sensitivity of the instrument against the known standard.

In employing the unit of invention in connection with an ion chamber and a quartz fiber needle electrometer for the measurement of radiation the "rate of charge" or "drift" method is employed and currents of less than about $10^{-16}$ amperes may be measured.

The arrangement thus generally described provides for fully automatic operation of the scaler eliminating the necessity for attendance by a trained operator as will more fully appear in connection with the following detailed description and accompanying drawings wherein:

Figure 1:
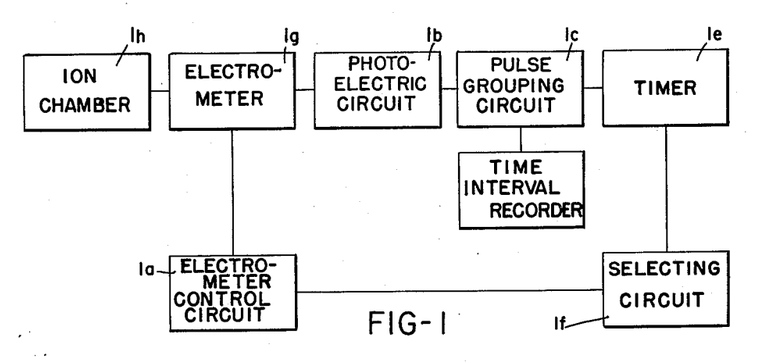
Figure 1 is a block diagram illustrating the basic components for measurement of radiation.

Referring to the block diagram of Figure 1 the automatic electrometer scaler is seen to comprise, in conjunction with a suitable ion chamber and a quartz fiber electrometer, the following constituents: (1) electrometer control circuit, indicated at 1a, (2) a photo-electric circuit, indicated at 1b, (3) a pulse grouping circuit, indicated at 1c, (4) a time interval recorder, indicated at 1d, (5) a timer, indicated at 1e, and (6) a selecting circuit, indicated at 1f. An electrometer is generally indicated at 1g and an ion chamber at 1h. Each of these operating components, including the sensitivity sensing arrangement, will be considered in turn after a brief discussion of the structural arrangement of the apparatus.

Figure 3:
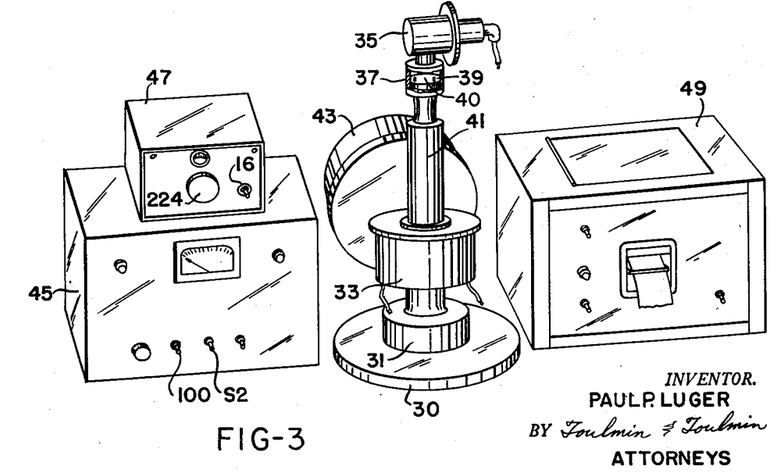

Referring first to Figure 3 and a general arrangement of the apparatus suitable for the practice of the invention, there is shown at 30 a support which encloses at 31 a light source and at 33 an electrometer housing having a suitable electrometer needle (as in Figure 5 at 51') as of quartz fiber. At the upper extremity of the support 30 a housing 35 encloses a photocell which receives light passing upwardly from the source 31 through a pair of slits, 37, 39; the slits are suitably provided in a mask as at 40 in the end of a brass tubing 41 which encloses an optical system comprising an objective lens (similar to 53 of Figure 5) in the lower end of the tube. The slits 37, 39 are in the focal plane of this objective lens. The tubing 41 is machine-fitted to electrometer housing 33.

To the rear of the electrometer in Figure 3 an ion chamber 43 is located and serves to actuate the needle of the electrometer; leftwardly a casing 45 houses the circuits and timer to be described with particularity hereinafter. Mounted on casing 45 is the control unit 47 for the supplying of a constantly varying known voltage to the needle of the electrometer and this unit, if desired, may suitably be housed with the timer.

Rightwardly of the electrometer support is a time interval recorder 49 which prints a continuous record of radiation and sensitivity measurements. This recorder may be any standard commercially available recorder, capable of actuation by pulses received from the pulse grouping circuit.

Figure 5:
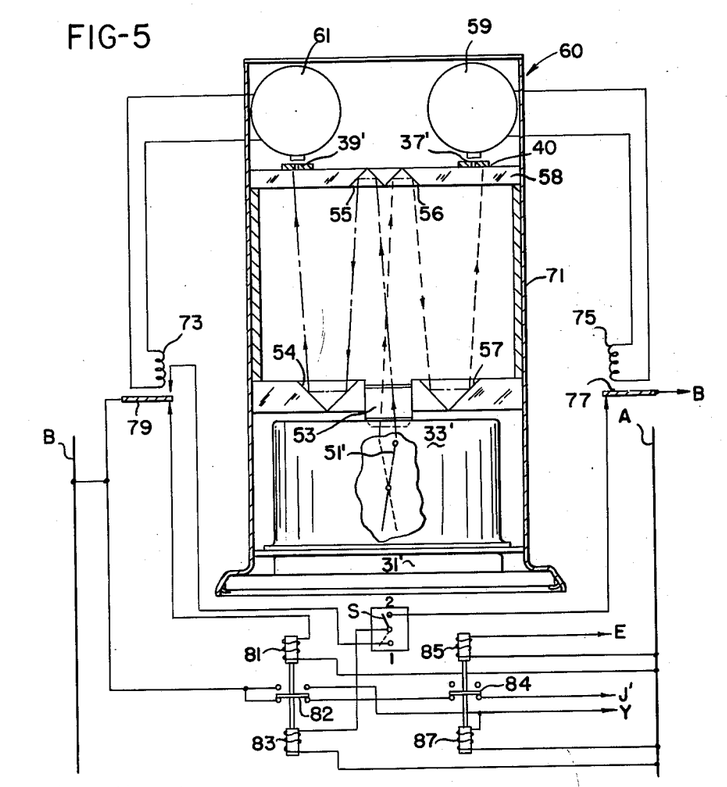
Figure 5 illustrates an embodiment of the invention for two phototube operation, Figures 6 to 8, inclusive, illustrate arrangements of the optical slit means useful in the practice of the invention.

The details and mode of operation of the electrometer and the two photocell arrangement may be more clearly visualized by reference to Figure 5 wherein the housing 33' encloses an electrometer needle 51' on which is mounted a cross-fiber 52'. As the needle moves across the light source 31', the real image (38, Figure 6) of the cross-fiber, which, in some applications, may be a small blob of glass, is projected to the slits 37', 39' by means of the objective lens 53 and prisms 54, 55, 56, and 57. Because of the short depth of field it will be recognized that the real image focussed on the slits 37', 39' is the real image of the cross-fiber 52', the remainder of the needle being out of focus. In accordance with the usages of the art, the real image of the needle is referred to, but it should be understood that this image is of the cross-fiber or the glass blob on the end of the needle dependent upon the type of electrometer employed.

The optical slits 37', 39' may be adjustable both in width and sideways slidably mounted and on a rotatable head generally indicated at 60 which contains the photocells 59, 61 and Ramsden eyepieces (not shown) may be provided for viewing the slits after rotation of the head.

The general mode of operation as indicated by the structures of Figures 3 and 5 involves initiating needle movement under the influence of energy supplied from the ion chamber, as at 43, to the electrometer needle, as 51', which under the impressed voltage applied to the electrometer is caused to move from the solid line position to the broken line position in Figure 5. In this traverse as may be seen from the dotted line between 51' and 39' which simulates a light ray, the image of the needle moves from the left in Figure 5 towards the right; the broken line through prisms 56 and 57 simulates the light ray after the traverse of the slits.

The photocells 59, 61 are actuated by the passage of the needle and image and the derived pulses which indicate the time of traverse or rate of needle movement are caused to produce a permanent record of the operation and to initiate various other functions of the apparatus as will be described more particularly below.

Figure 6:
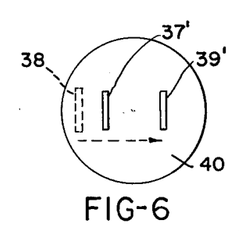
Figure 7:
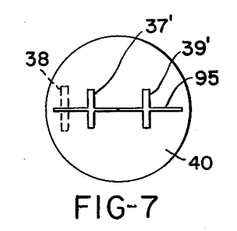

The image 38 of the needle is larger than the slits 37', 39' as shown in Figures 6 and 7 and accordingly is effective in cutting off the light of the source to achieve the noted mode of operation. It is thus seen that a new mode of photoelectric operation is adapted for use with very small movable elements, such as the needle, and that the use of an objective lens of suitable magnification for the formation of the real image not only results in an enlarged image but magnifies the distance through which the needle moves also.

Figure 8:
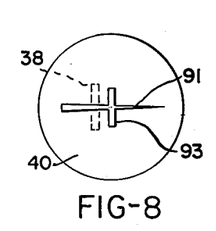

It is to be noted that Figures 7 and 8 include transversely extending optical slits as well as the principal vertical slits; the former are on the glass with the vertical slits. The substantially rectangular, long narrow slit 95 of Figure 7 aids in adjusting the reticule which contains the slits—the adjustment is made as with the assistance of, for example, a Ramsden 10X eyepiece, the slits being viewed and adjusted to insure that the slits lie in the optical plane and that the motion of the image of the needle is perpendicular to the length of the two principal optical slits; when using the Ramsden eyepiece the slit may span the field of vision and the image is initially readily located. The Ramsden Eyepiece is discussed at length in "Introduction to Physical Optics" by John K. Robertson, 1929, D. Van Nostrand, particularly at pages 108–111, inclusive.

The V-shaped slit of Figure 8, 91, provides an alternative for the narrow slit of Figure 7 and is particularly useful when operating with a photocell at each slit. This V-shaped slit has the additional feature that as the needle image traverses the slit a variable decrease of light flux occurs with respect to the principal slit or slits which change may be indicated with a micro-ammeter in the circuit, and accordingly the position of the needle image at any time may be readily determined by an operator.

The electrometer control

Figure 2:
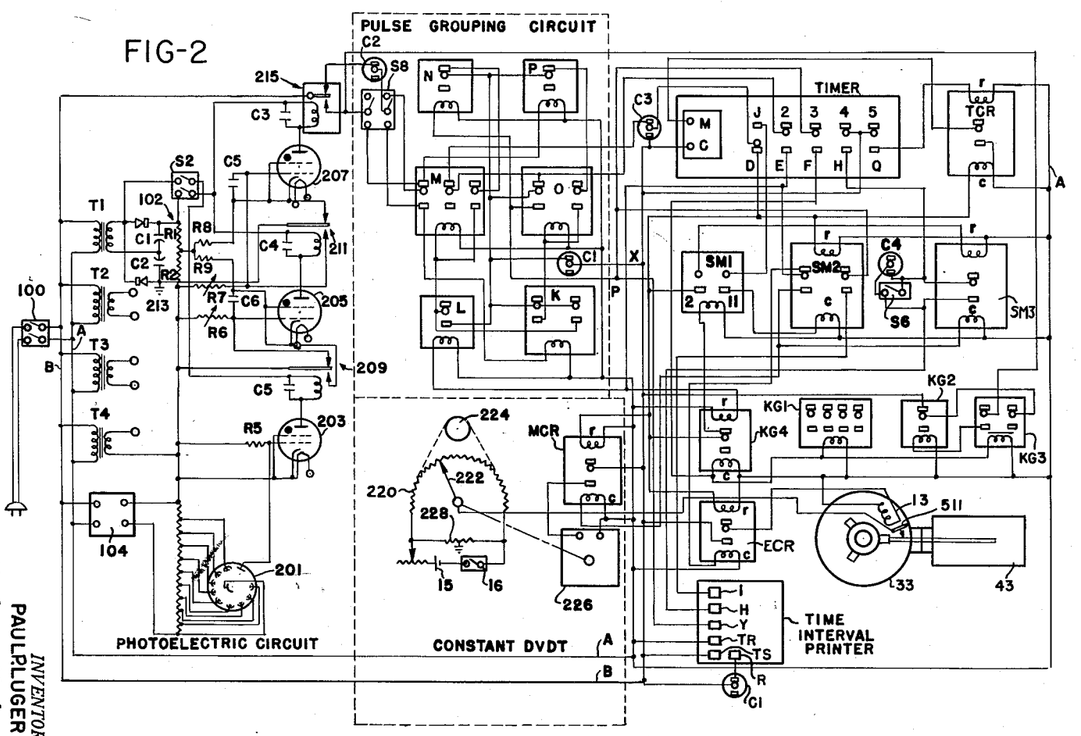
Figure 2 shows a preferred circuit diagram for the automatic electrometer scaler embodying the invention, Figure 3 indicates the general arrangement of one form of apparatus embodying the invention.

Referring to Figures 1 and 2 an ion chamber 43 is illustrated (Figure 2) as connected to an electrometer having a contact point 511 operated by a contact relay 13. The contact point 511 is provided with a biasing voltage from battery 15 upon closure of switch 16; alternatively, where the constant rate of change of voltage is not a component of the circuit the biasing voltage may be supplied to the electrometer as indicated at 266 in Figure 4. In either event the biasing voltage is applied through the contact point 511 of relay 13 and holds the needle to one side of the slit arrangement as indicated above with respect to Figure 5 and the needle accordingly is prevented from drifting when radiation measurements are not in progress. Energization of contact relay 13 causes retraction of the contact point and the needle may then drift past the slit arrangement under the influence of radiation from the ion chamber. De-energizing of the contact relay returns the biasing potential and the needle then assumes its initial position automatically.

Power supply

The apparatus may be suitably operated from 115 volt A.C. power supply through a switch 100 (Figure 2). It is convenient when referring to the power line to designate one side as A and the other side as B, as with few exceptions the closing and re-setting coils to be referred to hereinafter are permanently connected with the A side of the 115 volt A.C. supply; the B side of the line which supplies the potential to the various relays will be referred to as the B operating potential.

The circuit of Figure 2 is suitably provided with transformers T2, T3 and T4 which provide the power required for the operation of the various tubes of the unit. T1 is a 110–110 volt transformer which is effective to isolate the voltage doubler circuit indicated generally at 102 from the supply line and thus permits the negative side of the doubler circuit to be grounded. A high voltage power supply is provided as indicated at 104 for supplying high voltage across the photo-electric tube or tubes of the circuit.

The particular potentials required in the circuit of course depends upon the kind of electrometer or electroscope which is in use and the description particularly pertains to an electrometer scaler in which a Lindemann-Ryerson electrometer is employed; as will be understood by one skilled in the art various adjustments may be made depending upon the type of unit which is to be monitored.

The relays

In Figure 2 all of the relays are shown in their unenergized, that is, their re-set positions, the moving contacts of the relays being indicated by small circles.

The photo-electric circuit

The photo-electric circuit (Figure 2) functions to supply sharp pulses to the pulse grouping circuit, provides a filtering effect through a time delay for stray pulses which might trip the pulser relay to the pulse grouping circuit, and is effective in allowing the image of the electrometer needle to move as slowly as is necessary on and off at the optical slits without introducing a chattering effect in the pulser relay.

The circuit is constituted by a photo-electric tube 201 which may be a 931A and three thyratrons 203, 205, 207 which may be GL546's. Thyratron 203 is supplied with line voltage while thyratrons 205 and 207 derive their plate voltage from the voltage doubler circuit. The plate circuit of thyratron 207 includes a pulser relay which when energized has a position opposite to that shown in Figure 2.

In the operation of the photo-electric circuit the high voltage applied to tube 201 occasions a current flow through R5 and a voltage drop across the resistance holds thyratron 203 at cutoff when the image of the electrometer needle is not over the slits. In this condition relay 209 and relay 211 are in their normally closed positions as shown and thyratron 205 is also held at cutoff as its grid is grounded at 213 and its filament is some 100 volts positive through R9. Thyratron 207 however in this position is conductive for both its filament and grid are grounded at 213. Accordingly current flows in the plate circuit of thyratron 207 and the pulser relay 215 is energized, that is it is in an opposite position to that shown in Figure 2.

When the passage of the needle image across the slit interrupts the light flux to the photo-tube 201 the voltage across R5 decreases and the grid of thyratron 203 loses control, permitting the tube to conduct, which energizes the relay in the plate circuit of thyratron 203, closing relay 209.

Closure of relay 209 introduces a time delay before conduction occurs in tube 205 as the charge on the condenser C6 must first leak off through the resistance R6. The delay is preferably on the order of 1 to 2 seconds. When sufficient charge is leaked off of condenser C6, tube 205 conducts as its filament is grounded and its grid approaches ground potential, and this energizes the plate circuit of the tube closing relay 211 thereby making the filament of tube 207 some 100 volts positive while its grid is grounded, thus bringing the tube 207 to cutoff. This de-energizes the relay in the plate circuit of tube 207, closing the relay which then assumes a position similar to that shown in the figure.

As the image of the needle clears the slit and uninterrupted light falls upon the tube 201, a control current again flows to resistance 5 and tubes 203 and 205 are brought to cutoff, returning relays 209 and 211 to their normal positions as shown. Thyratron 207 however does not immediately conduct for the charge on condenser C5 must first leak off through resistance R7, and accordingly a time delay which may be of about one or two seconds, is again introduced. Thus it is to be noted that a time delay occurs both at the beginning and end of a pulse, which delay sharpens the pulse, discriminates against stray pulses and achieves the noted objective of allowing the image of the electrometer needle to move as slowly as is necessary on and off of the optical slits without occasioning chattering in the pulser relay.

It is accordingly seen that the passage of the needle results in B potential pulses which may be supplied to the pulse grouping circuit, as will be discussed hereinafter.

It is to be understood that other specific arrangements of the photo-electric circuit may be employed to accomplish the objectives of the invention; thus in one modification a thyratron, which is normally conducting and controls a pulser relay, may be driven by a second thyratron which is in parallel with a third thyratron, each of the latter two being controlled by resistance 5 of tube 201; the normally conducting thyratron (non-driving) is in this instance biased to cut off when the driver tends to conduct, but application of plate potential to the driver is delayed until the conduction in the driven tube has ceased.

The timer

The timer functions to initiate one radiation measurement cycle and to terminate the same; it controls the setting of the pulse grouping circuit and the application of the constantly varying voltages for sensitivity measurements (hereinafter termed the constant DVDT) and further, assists re-setting of the printing wheels of the time interval recorder, and re-setting of the sensitivity of the electrometer itself.

Essentially the timer is a motor driven clutch connected cam shaft which actuates successively five switches to effect the operations noted hereinbefore. As shown diagrammatically in Figure 2 the motor and clutch are disconnected and the cam shaft is in its normal position. The contacts made in the timer in the rotation of the shaft are each momentary.

Normally closed contact D permits the application of line voltage to the closing coil c of the timer control relay TCR; upon rotation of the shaft when action of the motor and clutch are initiated by the closing of the relay TCR contact is first made at E which sets the pulse grouping circuit by energizing relay L of that circuit. Simultaneously the closing coil of electrometer relay ECR is placed across the line to withdraw the biasing voltage from the electrometer needle to permit the same to move.

In tracing the circuits of the timer it is convenient to refer to point X of the diagram which is at B potential and connected to the timer through normally closed relays O and M of the pulse grouping circuit.

Contact F when connected into the circuit serves to energize the keep-going relays, which will be referred to more particularly hereinafter, and to thereby stop the radiation measurement if the radiant energy is excessive for the sensitivity of the instrument. Through this means also the sensitivity may be automatically adjusted so that measurements may continue uninterrupted on the basis of the decreased sensitivity.

The rotation of the cam shaft to contact H permits the re-setting of the printing wheels of the time interval printer and the circuit in which this contact is included permits switch S6 to be left open so that readings may be integrated before re-setting of the printer wheels, if desired.

Contact Q connects the timer to the re-setting coil of the relay TCR which when energized is effective to stop the motor and clutch of the timer. A spring return (not shown) permits the timer cam shaft to be returned to its normal position as shown in the diagram upon termination of this said operation of the timer.

The pulse grouping circuit

The pulse grouping circuit makes it possible for the electrometer needle to complete a cycle of operation when either one or two slit operation is employed, and further the pulse grouping circuit is connected to the time interval recorder to apply pulses to the same for the actuation thereof.

This pulse grouping circuit consists of six relays, M, N, O, P and L, K. Relays M and N together constitute an electrically locking and electrically re-setting relay; similarly, O and P; relays L and K are isolation relays; and relay L is effective to close relay M without occasioning the closing of relay O; relay K makes it possible to close relay O without immediately occasioning the re-setting of relay M. Thus relay M may be held closed during a pulse to relay K until that pulse has terminated.

For two-slit operation the switch S8 is connected, as shown in Figure 2, to the upper side. Initially a momentary B potential pulse from contact E is supplied to relay L of the pulse grouping circuit, and upon closure of this relay L line potential is applied to M through the now closed contact in relay L, and accordingly relay M closes, that is, it assumes a position opposite to that shown in Figure 2.

The passage of the image of the electrometer needle over the slit and associated photo tube 201 occasions a B potential pulse through the unenergized pulser relay 215 and this pulse is applied to K through relay M, thereby actuating the closing coil of relay O which connects the relay O to the time interval printer at contact Y. Relay M remains closed until the pulse through relay K has terminated, whereupon relay M is re-set by energization of the relay N.

When the needle has traversed the slit the first pulse in the slit operation is terminated and relay M returns to the position shown in Figure 2 and relay 215 assumes the position opposite to that shown in the figure. The time interval printer having had its action initiated continues to run as the image of the needle traverses the space between the slits. When the needle passes the second slit a pulse is again supplied to the relay M which is now in its re-set position and the pulse passes the relay P to re-set the relay O. At the same time the pulse passes the time interval printer, which thereupon terminates the action of the printer, indicating the end of the traverse of the needle image, and thus a permanent record is made of the time interval.

At the termination of the time interval defined by the two single pulses from the pulser relay 215, which initiated and terminated the action of the wheels of the time interval printer, the timer will again be started by the second pulse and thus is in a position by closing relay L to start a second radiation measurement.

The time interval recorder

The time interval recorder makes a permanent record of the pulses generated in the equipment. Upon a first pulse the time interval is started and on a second pulse at the printer the time interval is terminated and the printing hammer is energized and the recorder action is terminated for a cycle of measurement.

The printer hammer of the recorder is energized upon the second pulse which thus leaves a printed record of the time interval.

Referring to Figure 2, terminals TR and TS are supplied from the 115 volt A.C. line and the B potential resulting from the pulses is applied at terminal Y; at terminal G a pulse is applied by the timer from H for the re-setting of the printing wheels to zero.

The recorder is commercially available from several different manufacturers and may be any suitable type capable of being energized by a pulse.

Circuit operation

The components thus far described are the only units necessary for the making of continuous radiation measurements.

Summarizing the operation of these units, it is to be noted that when the switch 100 is thrown voltage is applied to the apparatus through line A, closing coil $c$ of relay TCR to contact D and thus through relay M and relay O to point X in the B potential line. The flow of current actuates the relay TCR to start the motor and clutch, and upon making the momentary contact at E the relay L of the pulse grouping circuit is set and also coil $c$ of the relay ECR is energized to open contact 511 to permit the electrometer needle to move. The movement of the electrometer needle casts an image upon the slit, thus actuating the photocell and its combined circuitry to generate a pulse. This pulse is transmitted through relay M which has been closed by the energization of relay L and through relay K and relay O to pulse the time interval recorder and permanently indicate the needle movement.

After the passage of the pulse through relay K relay M is returned to its normal position to receive the pulse occasioned by the passage of the needle across the second slit. This pulse returns relay O to its normal position and terminates the motion of the time interval recorder and thus defines a complete radiation measurement.

If switch S6 is closed the printing wheels are re-set after each measurement; if switch S6 is left open the measurements are allowed to integrate; as the timer makes contact at Q the motor is de-energized and the spring return on the cam shaft returns the same to its normal position for another measurement.

It is to be noted in connection with the circuit operation that setting of the pulse grouping circuit may be avoided if desired by utilizing for the pulse grouping an arrangement in which a round and round ratchet sequence relay controls two double throw contacts. One contact then closes on the first and third pulse to an operating coil and opens on a second and fourth pulse while the other contact closes on the second and fourth pulse and opens on the alternate pulses. The first contact, in this modification, applies B potential, when it closes, to the time interval recorder; the second contact when it closes applies B potential to start the timer and when opened the potential is applied to the timer at contact F. With this arrangement an additional relay is required for one slit operation.

Constant DVDT and sensitivity circuits

For the purpose of making sensitivity measurements and for the automatic recording of the sensitivity under which the electrometer is operating, a constantly varying voltage may be applied to the electrometer needle after the making of a series of radiation measurements. Thus it is possible with the arrangement of invention to frequently and quickly check the electrometer sensitivity, to accurately determine the sensitivity if desired, and to modify the sensitivity automatically.

These functions are effected, as indicated in Figure 2, through the combination of a slide wire arm and a slide wire resistance and associated circuitry. Slide wire resistance 220 is mounted upon a shaft (not shown) and has a constant resistance per unit length and may be set in any position with respect to the slide wire arm 222 by means of a manual adjusting knob 224, as schematically illustrated in the diagram.

The manual adjusting knob in addition to rotating the slide wire also carries (Figure 3) a circular 360° scale operable against a fixed index, which index shows the return position of the slide wire arm relative to the slide wire. By means of the knob 224 the electrometer needle may be biased, by means of battery 15 and switch 16, to any suitable initial working position.

The slide wire arm is mounted upon its own shaft to rotate independently of the slide wire or slide wire resistance 220 and is suitably provided with a spring return in order that when rendered inoperative it will return to a set fixed position. A stop mounted on a frame which supports the slide wire arm catches the arm in its return position.

The slide wire arm is clutch connected to a synchronous motor indicated schematically at 226, which motor and clutch are rendered operable upon the closing of motor control relay MCR.

The position of the electrometer needle is initially adjusted by inserting a micro-ammeter into the photo-electric circuit between the anode of tube 201 and the grid of 203; thus the decrease of flux as the needle passes over the slits is observed on the micro-ammeter, and the two positions indicated by the needle in its passage are readily determined on the scale. If these two positions representing the passage of the needle over the slits are about 30 scale divisions apart then a satisfactory biasing condition for the needle image with respect to the first optical slit would be about 10 scale divisions to the side thereof. This method of adjusting the electrometer needle preliminary to the operation of the automatic electrometer scale has been found most suitable.

It is convenient to ground the slide wire at a point about one-third the distance therealong and this is effectively done by shunting the slide wire with two resistances in series indicated at 228 which are grounded where they join. It is then convenient to make the mechanical zero of the electrometer needle coincident with the grounded position of the slide wire and for this position to be coincident with the first optical slit. This position of the slide wire may also, if desired, be made the zero reading of the scale and the micro-ammeter in the anode circuit of the photo-multiplier tube 201 will then show a dip for the zero of the scale.

A constantly varying voltage may be automatically brought into operation after a series of radiation measurements have been effected and this is accomplished by providing sensitivity relays SM1, SM2 and SM3, which switch the circuit in the following manner: relay SM1 is an 11-step relay which controls the sequence of say 10 radiation readings followed by one sensitivity measurement. The relay itself is a round-and-round ratchet sequence relay with 11 steps on the ratchet wheel, so that 11 impulses of the closing coil c of the relay SM1 makes a complete rotation of the cam shaft.

The cam shaft carries two cams for operating the two switches indicated at 2 and 11 in the diagram; one of these closes on the 11th impulse and opens on the following impulse, while the contact marked 2 is closed on the second impulse and is opened on the following impulse.

The sensitivity measurement is initiated by the closing of contact 11 which connects contact J of the timer to SM2, thereby to actuate the closing coil of relay SM2, which relay when closed connects contact E to the closing coil of the motor control relay MCR, to thereby set the motor and clutch 226 into operation. Simultaneously with the energization of contact J relay SM2 operates to disconnect contact E of the timer from the electrometer control relay ECR; thus the electrometer contact 511 remains connected to the electrometer and collecting electrode of the ion chamber, so that when E is energized the constantly varying potential drives the electrometer needle.

Relay SM2 also connects contact point P of the pulse grouping circuit to a solenoid in the time interval printer, so that an asterisk appears along side of the printed record corresponding to each sensitivity measurement, and for this purpose the second contact of relay SM2 is shown connected to I of the time interval printer.

Accordingly, the printed record of the constantly varying potential applied to the electrometer needle is made reflecting the passage of the needle, as was described in connection with the radiation measurements themselves.

Relay SM3 is an auxiliary relay which is operable to reset the printing wheels of the time interval printer to zero once a group of 10 radiation measurements, for example, and a sensitivity measurement have been made. This relay prevents contact H from completing a re-set operation, so that measurements may integrate in the noted or other desired group. If desired however switch S6 may be closed to shunt the contact so that the wheels are re-set after each measurement.

The relay SM3 in operation is closed through contact E of the timer in series with the normally open contact of relay SM2 and is re-set by the second contact of SM1 and is the final operation prior to the resumption of radiation measurements.

Thus far there has been described the operation of the device for the automatic making of radiation and sensitivity measurements. However it may occur though a very large impulse may be applied to the electrometer needle which would injure the apparatus and accordingly provision may be made to either shut down the apparatus upon such a surge or to decrease the sensitivity of the device to accommodate the surge.

The following description pertains to a "keep-going" circuit which is capable of switching the apparatus to decrease the sensitivity automatically.

The keep-going relay circuit

The operation of the "keep-going" relay and sensitivity-sensing circuit is predicated upon a time relationship between the needle movement and the setting of the timer as regards contacts E and F, and may be understood most clearly by assuming that the time interval is started within about 10 seconds after the needle is freed for movement through contact E of the timer. Under this condition if the timer is so set that the contact F will be closed within ten seconds after the closing of contact E, contact F will be energized if a large pulse of radiant energy moves the needle from its initial position to the first slit in less than ten seconds.

On the other hand, since contact F is a momentary contact, if the movement of the needle follows a normal pattern, contact at F will have been made and passed before any energization thereof may take place. If no energization of contact F takes place in the rotation of the shaft of the timer, radiation measurements continue in their normal fashion. Contrariwise if contact F becomes energized the keep-going relay circuit comes into operation, and this is constituted by relays KG1, KG2, KG3 and KG4.

Thus, as will be clearly seen from Figure 2, when contact F is energized momentarily by the movement of the cam shaft, relays KG1 and KG3 close since they are now connected to B potential through contact F. These relays KG1 and KG3 are electrically locking relays and are re-set by relay KG2, two relays being used to facilitate description and because of the large number of contacts involved.

The closing of KG3 applies B potential to the closing coil c of relay KG3 and relay KG1 to keep them locked after the passage of the momentary pulse through contact F. Relay KG1, the contacts of which are indicated in Figure 2, C1, C2, C3 and C4 adjacent respectively the pulse grouping circuit and time interval printer, switch 8, the motor and clutch of the timer, and to relay SM3, are the principal components of this arrangement. Thus upon closing of the left hand contact of KG1 the printing hammer circuit, indicated at R and C1, is opened to render the hammer inoperative; simultaneously the pulse grouping circuit to B potential at X is opened; closing of the next contact C2 cuts off the operating potential B in the pulse grouping circuit to render the circuit completely inoperative. The next contact C3 switches the moving part of contact D of the timer to the operating potential B as at X, so that after the resetting of the timer the apparatus immediately re-starts itself upon the re-starting of the timer. Simultaneously with this action the relay ECR is re-set so that the needle is returned to its original biased position.

The fourth contact of relay KG1, that is the right hand contact, is associated with the relay SM3 and is operable to re-set the wheels of the time interval printer to zero. Accordingly it is seen that upon receipt of an impulse at F in the rotation of the timer cam shaft, the pulse grouping circuit, time interval printer, and the motion of the electrometer needle itself are inactivated.

The relays KG1, KG2 and KG3 are re-set through the normally open contact of the pulser, which is energized by the light flux of the phototube 201, the re-setting taking place through the left hand contact of KG3.

The relay KG4, while not vital to the operation of the circuit, is utilizable to halt the 11-step relay SM1 and to thus provide that a full 10 radiation measurements will occur between each sensitivity measurement. This relay, simultaneously with the other sensitivity-sensing relays, is closed by contact F of the timer and will be re-set on the next cycle by contact E of the timer.

It is thus apparent that the elimination of relay KG4 would leave a permanent indication on the time interval printer of the number of times that it was necessary to actuate the "keep-going" relay in a given period of operation and thus this relay need not be employed if such indication is desired.

Figure 4:
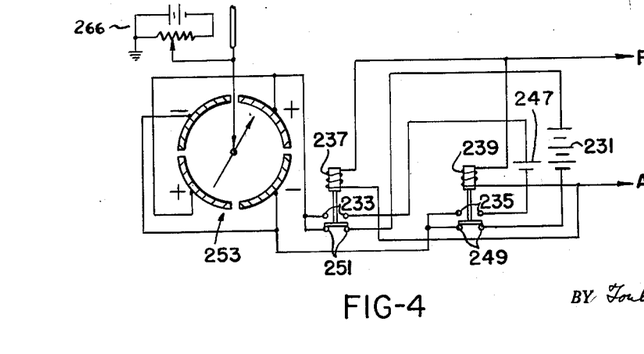
Figure 4 is a circuit diagram illustrating an arrangement useful with the invention for automatically changing the sensitivity of the electrometer.

This circuit as described is effective only to sense the need for a change in sensitivity. Figure 4 indicates the manner in which such a sensitivity change may be attained for a quadrant electrometer. There is shown in Figure 4 an electrometer 253 which is provided with a voltage from battery 231 through normally closed switches 249, 251 having solenoids 237, 239 associated therewith. A lead extends from one side of solenoid 237 to contact F of the timer, while a second lead extends from solenoid 239 to the same contact F.

Upon energization of solenoids 237 and 239 by receipt of a pulse from contact F, switches 233 and 235 are moved to the normally open side where they remain, to thereby place in the circuit battery 247 and cutout battery 231 of larger capacity, thus changing the potential on the quadrant electrometer, and thereby decreasing the sensitivity of the electrometer.

One slit operation

It is thus to be noted that there has been described a complete arrangement for a two slit operation of this device. For one slit operation, whether the constant DVDT and sensitivity circuits are employed or not, it is only necessary to throw switch S8 of the pulse grouping circuit to a downward position. In this condition of operation the bias is removed from the needle and the timer sets relay L and hence relay M as described for two slit operation. When the needle traverses the single optical slit, as 93 in Figure 8, or 37', as in Figures 6 and 7, relay M having been closed by the operation of the timer, a pulse is generated which sets the relays K and O and actuates the time interval printer. The pulser is at this time in a de-energized condition as 207 is not conductive.

As soon as the image clears the optical slit the pulser again energizes and potential B is applied through the normally open contact of the pulser and the normally closed contact of relay M to close relay P which in turn closes relay O and thereby terminates the measurement and the action of the time interval printer.

Referring again to Figure 5 and the modified arrangement for two slit operation shown therein, the structural components within housing 71 and the mode of operation thereof have already been described. The circuit in this instance comprises essentially a flip-flop relay defined by coils 81 and 83 which when closed starts the time interval and when re-set terminates the time interval.

The relay defined by coils 85, 87 sets this circuit through contact E of the timer in a similar manner to that described in connection with Figure 2. Accordingly when the switch shown is at the number two position and E of the timer has set the relay defined by coils 85, 87 movement of the needle past the first slit de-energizes the coil 73, sending a pulse through the coil 81 to bring the relay to an energized position, that is, opposite to that of the diagram. Upon closing of the relay, B pulse is transmitted to Y to initiate the action of the time interval printer. At the same time that this relay is energized the relay defined by the coils 85, 87 is re-set, but B potential does not immediately return through J' to the moving contact below J of the timer as the coil 81 is energized. The movement of the needle past the second slit re-sets the flip-flop relay applying the potential through J' to the timer, and at the same time the operation of the recorder is terminated by the withdrawal of the B pulse.

The thus described simplified circuit is particularly useful for two photo-cell operation when either one or two slits are employed; by merely throwing the handle of the switch to the one position the relay having the coils 81, 83 is re-set upon termination of the passage of the needle past the first slit in one slit operation.

It will be recognized by those skilled in the art that the embodiments described above provide an improved method and means for the measurement and recording of the rate of change of position of the deflection element and thus the average of the phenomena measured (e.g. the current from an ionization chamber). In some applications it is desirable to measure the instantaneous value of the rate of change of position of the deflection element. In such cases, the embodiment shown in Figure 9 is advantageous.

Figure 9

Figure 9:
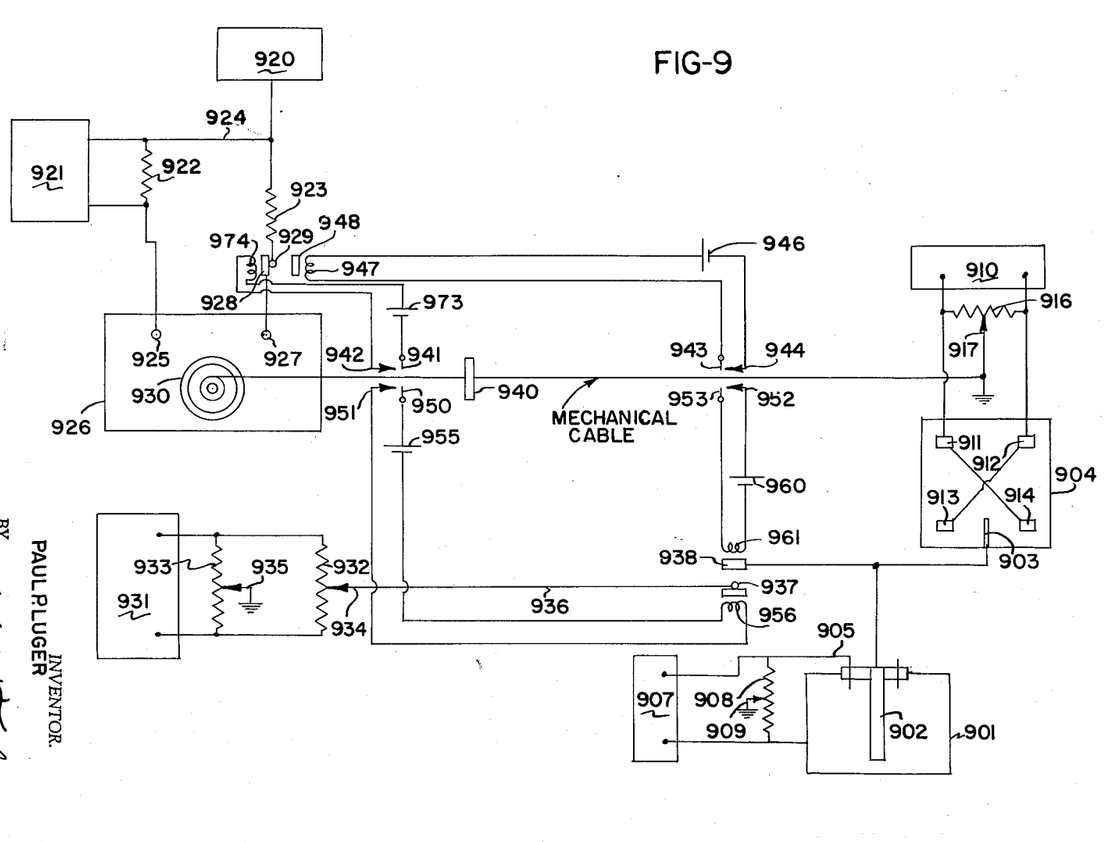
Figure 9 is a schematic diagram of another embodiment of this invention.

In Figure 9 there is shown an ionization chamber 901. The ionization probe 902 is connected to the needle 903 of the electrometer 904. A potential differential is maintained between the guard ring 905 and the ionization chamber by a regulated voltage source 907. A resistor 908 is connected between the terminals of the regulated voltage source and is supplied with a variable tap 909 which is grounded in order to vary the ground position of the potential applied between the ionization chamber and the guard ring.

Similarly, a regulated voltage source 910 supplies a source of regulated uni-directional potential across the electrometer quadrants 911, 912, 913, and 914 which are cross-coupled in the usual manner. A resistor 916 is connected across the terminals of the regulated voltage source and has a variable tap 917 associated therewith. This tap is grounded in order to vary the ground position of the voltage differential applied across the electrometer quadrants and thus vary the initial position of the electrometer needle.

The real image of the electrometer needle 903 is projected upon a mask having a single slit in the same manner as explained in connection with single slit operation of the circuit of Figure 2. As the electrometer needle moves, its real image will be displaced from an overlapping relationship with a slit in the reticle thus varying the amount of light transmitted to the photocell circuit mounted adjacent the mask, causing variation in the output of the photocell circuit 920 in the same manner as explained previously.

To compare the variation in the output of the photocell circuit with a known quantity, a source of uni-directional reference voltage 921 is applied across resistor 922. The variation in the output of the photoelectric circuit is developed across resistor 923. One terminal of resistors 922 and 923 is maintained at a common potential by connection 924. The other terminal of resistor 922 is connected to terminal 925 of a strip recorder 926. The other terminal of resistor 923 is connected to terminal 927 of the strip recorder through the normally closed contacts 928 and 929.

The strip recorder 926 may be any of the commercially available strip recorders which contain an amplifier for the amplification of the differential in potential applied to terminals 925 and 927 and, after such amplification, means for recording the potential differential by moving a pen over a moving chart. The pen movement is controlled by a motor 930, contained within the strip recorder and controlled to move proportionately as the potential differential applied by one of the conventional feedback circuits known to the art. One example of a suitable recorder is that manufactured by Minneapolis-Honeywell Regulator Company and described in their catalogue No. 1521–R.

At the start of a measurement the strip recorder pen is located at the zero position. In order to provide means for positioning the electrometer needle in a corresponding position, a biasing voltage source 931 is supplied. This source of regulated voltage is connected across the parallel resistors 932 and 933. In order to adjust the magnitude of the biasing potential a variable tap 934 is associated with resistor 932. In order to allow adjustment of the biasing potential, both positively and negatively, a grounded variable tap 935 is associated with resistor 933. The biasing potential is applied over connection 936 and the switch contacts 937 and 938, when closed, to the needle 903 of the electrometer. Application of the biasing potential drains off any accumulated charge on the electrometer needle returning the potential to the bias potential and thus returning the needle to its bias (zero) position in the electrometer.

Coordination between the initial "zero" positions of the strip recorder pen and the electrometer needle is provided by the cam 940 and the associated limit switches. The cam 940 is mounted on the cable used in the strip recorder to drive the pen and which is employed in this invention for the additional purpose of driving the variable tap 917 on resistor 916. It will be understood by those skilled in the art that the cable is usually a flexible woven wire cable mounted in an endless loop. For the purpose of simple schematic representation it is treated as an equivalent rigid cable capable of moving the cam 940 and the variable tap 917 in both directions on Figure 9.

In order to control the application of the output from the photocell circuit 920 to the strip recorder, limit switches comprising contacts 941 and 942, and contacts 943 and 944 are provided. When the pen on the strip recorder reaches the zero position and is thus prepared to record the output of the photocell circuit, cam 940 will momentarily close contacts 941 and 942. This switch closure will apply power from battery 973 to solenoid 974 pulling the movable contact 929 into contact with the stationary contact 928 to apply the potential from the photocell circuit 920 to the recorder terminal 927.

Similarly when the pen of the strip recorder has reached the limit of its travel cam 940 will close contacts 943 and 944 momentarily. This closure will apply power from battery 946 to solenoid 947 causing movable contact 929 to move into contact with contact 948 removing the signal of the photocell circuit from the recorder. The relay used is of the flip-flop type. It will be recognized by those skilled in the art that the circuit used for this make and break connection could also be a rotary type switch driven by impulses from a single battery in accordance with the operation of the two limit switches. In this invention it has been found desirable to employ the separate circuits to preclude the necessity of examination and setting of a rotary type impulse switch.

The electrometer needle is biased to a "zero" position and allowed to move in accordance with the unknown potential by the operation of similar limit switches comprising contacts 950 and 951 and contacts 952 and 953. At the zero position the cam 940 causes momentary closure of the contacts 950, 951 which applies power from battery 955 to solenoid 956 causing the removal of the biasing potential from the electrometer needle by movement of the movable contact 937 out of contact with contact 938. In the same manner when the pen reaches the limit of its movement, momentary closure of switch contacts 952, 953 apply power from battery 960 to solenoid 961 thereby returning the electrometer needle to its biasing potential by movement of the contact 937 carrying the biasing potential into contact with electrode 938.

In operation the electrometer needle is biased to a position wherein the real image thereof is cast in overlapping relationship to a single slit in an opaque mask. In such position no light impinges upon the photocell mounted behind the opaque mask and no signal is generated thereby. The operation of the optical system in the casting of this real image and the generation of a signal by the associated photocell circuit has been explained in connection with the single slit operation of the foregoing embodiments and will not be repeated here.

At this point the pen of the strip recorder is at its zero position and the instrument is ready for a measurement cycle. In the zero position the cam 940 will momentarily close the contacts 941 and 942 and contacts 950 and 951 of the limit switches thus simultaneously applying the output from the photocell circuit to terminal 927 of the strip recorder and remove the bias potential from the needle 903 of the electrometer. As the current drawn by the ionization chamber changes the potential of the electrometer needle, the needle will move due to the interaction between the potential of the needle and the potential of the electrometer quadrants. Needle movement, greatly magnified by the optical system, will cause the real image to move from its overlapping relationship to the slit in the opaque mask and allow light to fall upon the photoelectric cell, thus causing the photocell circuit to generate an output signal. This output signal causes terminal 927 of the strip recorder to change potential with respect to the reference terminal 925. The potential differential is amplified by the strip recorder and causes rotation of the motor 930 to drive the strip recorder pen across the moving chart to provide a permanent record of the potential differential. Simultaneously the variable tap 917 is moved across resistor 916 to change the location of the ground point of the potential applied to the electrometer quadrants.

The change in the position of the ground point of the potential applied to the electrometer quadrants will, of course, change the spatial positioning of the electrometer needle through its interaction with the potential applied to the electrometer quadrants. In this instrument the change in the ground point is arranged to move the needle in the direction of its initial physical position. It will thus be recognized by those skilled in the art that the needle of the electrometer is at all times constrained in its movement to its initial physical position. The only deviation from the initial position is that slight movement necessary to generate an error signal. The change in the position of the variable tap, giving a change in the ground position of the quadrant potentials, is recorded by the movement of the pen of the strip recorder.

It will also be recognized by those skilled in the art that the magnification of the optical system will prevent all but the slightest physical movement of the electrometer needle. Only a very slight physical movement is discernible in order to generate the needed error signal.

When the strip recorder reaches the end of its travel on the moving chart, cam 940 will momentarily close the contacts 943 and 944 and contacts 953 and 952. Closure of these limit switches will simultaneously remove the potential applied from the photocell circuit from terminal 927 and apply the biasing potential to the electrometer needle 903. Removal of the potential generated by the photocell circuit from terminal 927 will cause the motor 930 of the strip recorded to drive the pen to the zero position. Simultaneously the ground point of the electrometer will be returned to its initial or zero position and through the application of the biasing potential to the electrometer needle the needle will be restored to the zero physical position. At this point the instrument is ready for a new measurement cycle.

Thus the instrument accomplishes the object of continually measuring the output of a measurement instrument such as an ionization chamber by repetitive measurement cycles which need not be attended and are recorded in printed form.

It will be recognized by those skilled in the art that it is often desirable to periodically apply a calibration curve to the recorded curves by application of a potential changing at a known rate in place of the unknown potential. This may be done in the same manner as previously explained in connection with the embodiment illustrated in Figures 1–5. With the record of such potentials, the absolute value of unknown currents may easily be computed.

The reference voltage sources 907, 910 921 and 931 set forth in Figure 9 may most conveniently be any conventional circuit providing a high degree of voltage regulation. The amplification of the potential differential applied to terminals of the strip recorder is satisfactorily done by the amplifier contained within the commercial strip recorders.

It will also be recognized by those skilled in the art that the removal of potential from terminal 927 is done for simplicity in this embodiment. In this embodiment of the invention a generation of a signal from the photocell circuit is a non-directional generation. Since the movement of the electrometer needle is constrained under normal circumstances to movement in one direction, this arrangement is entirely satisfactory. In those applications where the measurement of a rapidly fluctuating phenomena is to be made, employment of a V-shaped slit in the opaque mask is preferably employed. As will be recognized by the skilled in the art, the use of a V-shaped slit, as explained in connection with the superimposed V-shaped slit of Figure 8, will give a unique signal output from the photocell circuit for each position of the real image along the slit. With this arrangement, the strip recorder will reset to zero position on application of the bias potential to the electrometer needle, dispensing with the need for the photocell limit switch circuits. As will be recognized by those skilled in the art, the specific choice of instrument components will depend upon the application to which the instrument is put.

It will also be apparent to those skilled in the art that instead of driving the ground position of the electrometer quadrants for nulling of the electrometer needle, it is possible to vary the ground point of the ionization chamber by moving tap 909. It is also feasible to vary the potential applied to the electrometer quadrants. In the latter case, however, it is not possible to calculate absolute values of current by comparison with a known potential because of the non-linear relationship between deflection and quadrant potential variation.

The arrangements thus generally described, utilizing the rate of charge of the "drift" method, have a distinct advantage of high precision together with high sensitivity, if required; the filter means in the photo-electric circuit materially contributing to this result.

The device has relatively few parts, is relatively easy to maintain in repair, may be used at all intensity levels, even for the measurement of low energy particles. Reading of the instrument is a simple matter as computations are substantially negligible.

Thus when used in connection with radiation measurements the amount of ionization produced in an ion chamber is readily determinable by the relationship $$i = C\left(\frac{SM}{RM}\right)$$

where SM is the time interval in seconds for the sensitivity measurement, RM the time interval in seconds for the radiation measurement, and where C is a constant depending upon whether the ionization is to be expressed in amperes, curies, or roentgens per hour. The value of C is also dependent upon the capacity of the electrometer and collecting electrode, the rate of change of voltage of the constant DVDT and also, except for the result in amperes, upon the volume of the ion chamber.

The arrangement described is flexible as various modifications may be employed, as for example, in the photoelectric circuit by selection of capacitative, resistance and tube values, in the grouping circuit by substitution of other equivalents for the electrically locking, electrically re-setting relays, and in the sensitivity and sensitivity sensing systems by adaption of the principles described to specific apparatus.

The instrument has the further advantage that it may be readily applied to those electrometers which are ordinarily used with a telescope and scale; thus the telescope and scale of the ordinary instrument may be replaced with a light source, a double optical slit and one or two photo-multiplier tubes depending upon the separation of the slits, and accordingly the ordinary instrument may be readily adapted for use with the electrometer scaler.

The principles outlined hereinbefore are adaptable, for example, with galvanometers having substantially zero restoring torque where the friction is such that it may be neglected or where the friction is constant, that is in a linear function of the speed of deflection.

Finally it is to be noted that the objectives of the invention have been achieved since the instrument will operate in conjunction with an electrometer, an ion chamber or other device having an element movable at a rate proportional to the energization and reading of the instrument without the attention of a trained operator, and a permanent printed record of the operation is always available.

It will be understood that this invention is susceptible to modification in order to adapt it to different usages and conditions and accordingly, it is desired to comprehend such modifications within this invention as may fall within the scope of the appended claims.

I claim:

1. In combination with an indicating instrument having a movable element mounted within an electrostatic field and a needle associated with said element for the indication of movement of said element, monitoring apparatus for the continuous recording of element movement upon the application of unknown potentials to said element comprising: an illuminating source for illuminating the needle; an optical system; a mask containing an aperture of predetermined outline; said source, optical system, and mask dimensioned to cast a real image of said needle on said mask in overlapping relationship to said aperture, a transducer positioned adjacent said aperture to generate an undulating electric signal responsive to the location of said image along said aperture; means responsive to said undulating signal for varying said electrostatic field; and means simultaneously operable with said last named means for recording the variation in said electrostatic field.

2. In combination with an indicating instrument having a movable element mounted within an electrostatic field and a needle associated with said element for the indication of movement of said element, monitoring apparatus for the continuous recording of element movement upon the application of unknown potentials to said element comprising an illuminating source for illuminating the needle; an optical system; a mask containing an aperture of predetermined outline; said source, optical system and mask dimensioned to project a real image of said needle on said mask in overlapping relationship to said aperture; a transducer positioned adjacent said aperture to generate an undulating electric signal responsive to the location of said image along said aperture; and means responsive to said undulating signal for varying the magnitude of said electrostatic field.

3. In combination, a quadrant electrometer having a movable needle and means for establishing an electric field therein, a source of electric potential, means for applying this potential to said needle, said needle being movable through the interaction of said applied potential and said electric field, means to vary the electric field so that the needle will remain in its original position irrespective of the applied potential, said last means comprising a source of illumination, an optical system, said source and said optical system positioned with respect to said needle to form a real image in a plane, an opaque mask having a slitted aperture therein mounted in said plane, means responsive to incident illumination for the generation of an electric signal mounted adjacent said slit and in such position as to be illuminated by said source through said slit, and means for coupling said electric signal to said adjustment means to effect said field variation.

4. In combination, a measuring instrument having a movable indicator and means for establishing an electric field therein, a source of unknown potential, means for applying said potential to said indicator, a light source, an optical system, an opaque mask having a slitted aperture therein, a photocell, said optical system so dimensioned as to cast a real image of said indicator as illuminated by said source upon said opaque mask, biasing means for initially adjusting said indicator position so that the real image thereof coincides with said aperture, means responsive to the generation of a signal by said photoelectric means to adjust said electric field and hold said indicator in such position that the real image coincides with said aperture, and means responsive to said last named means for recording the variation in electric field and thus the value of the applied potential.

5. Monitoring apparatus comprising, in combination, a source of line potential; a timing device including a motor to be actuated from said source of line potential for driving the timing device; said timing device having a contact through which said motor is connectible to the line potential; a deflection instrument having an element movable at a rate proportional to the energization of the instrument; means including an objective lens and a source of light positioned to provide a real image of the element in its movement; an opaque mask means having a slit therein formed in the plane of the real image of the element and arranged to be traversed by the real image in the movement of the element and its image to cause a change in the intensity of light on the slit means; photoelectric circuit means, including photoelectric cell means positioned to be actuated by a change in the intensity of light on the slit means by the traverse of the real image, said photoelectric circuit means in combination with said slit means being adapted to initiate a pair of spaced electric pulses in response to a single traverse of the slit means by the real image; a time interval recorder; circuit means connecting the time interval recorder with the photoelectric circuit means for the passage of the spaced pulses to the recorder through the circuit means; the latter said circuit means dimensioned that the first of said pulses initiates the action of said time interval recorder and the second of said pulses terminates the action of the recorder; said latter circuit means also forming an electrical connection between the said contact of said timing device and said source of potential which connection is broken by the first of said pulses and remade by the second of said pulses; voltage means to bias said element and its image to an initial position to one side of the slit means; means to remove said bias voltage from said element to permit said element to move; and means energizable through said contact of said timer to restore said bias to said element at the termination of the second pulse.

6. Monitoring apparatus comprising a deflection instrument having an element movable at a rate proportional to the energization and reading of the instrument, circuit means, including photoelectric means, actuable upon movement of said element to initiate a series of electrical pulses, means to alternately and singly apply an unknown voltage and a constantly varying known potential to said element to drive the same in two cycles to thereby initiate a first and second series of pulses, and recorder means sequentially operated by said first and second series of pulses to provide a comparison of the time intervals of the cycles.

7. Monitoring apparatus comprising a deflection instrument having an element movable at a rate proportional to the energization and the reading of the instrument, means to apply an unknown potential to said instrument to drive said element, circuit means, including photoelectric means, to derive a series of pulses from a single cyclical movement of said element, recorder means operable by said pulses to indicate the time interval between said pulses, means to integrate upon said recorder means a plurality of time intervals for a like plurality of element movements, and means, at the termination of said plurality of element movements, to apply a constantly varying potential to said instrument to drive said element at a rate proportional thereto and to similarly attain a time interval therefor for comparison with said other time intervals.

8. Monitoring apparatus comprising an electrometer having a movable needle and slit means spaced from the needle, means including an objective lens and a source of light arranged to cast a real image of said needle on said slit means in the movement of the needle, means to bias said needle to one side of said slit means, circuit means including photoelectric cell means arranged to receive light from said source through said slit means, said circuit means including a time delay filter and being operable upon movement of said needle to provide a series of sharp pulses, a relay system and timer means to trigger the system to receive said pulses, said timer means being energizable to remove the bias from said needle for movement thereof, and recorder means connected to said relay system to be pulsed thereby to indicate the time of travel of said needle across said slit means.

9. Monitoring apparatus comprising an electrometer having a movable needle and slit means spaced from the needle, means including an objective lens and a source of light to cast a real image of said needle on said slit means in the movement of the needle, circuit means including photoelectric cell means and a time delay filter and being operable upon movement of said needle to provide a series of sharp pulses, an ionized source to energize the needle for movement, a timer, a pulse grouping circuit connected to said timer to be set thereby and to said circuit means to receive pulses therefrom, recorder means operable by pulses received from said grouping circuit to indicate the time interval of said needle movement when energized, a relay system energizable through said timer from said pulse grouping circuit, a source of constantly varying known potential applicable to said needle upon energization of said relay system for driving said needle in response to said potential to similarly operate said recorder for comparison of the time interval occasioned by said potential with that caused by said ionized source.

10. In apparatus for sensing an excessive energization of a movable needle of an electrometer, an electrometer having a needle, a timer having a contact energizable momentarily in the operation of the timer, a pulse grouping circuit operably connected with said contact for the passage of a pulse from said circuit thereto, means responsive to movement of the needle to generate spaced electrical pulses, the time period between which is reflective of the energization of the needle, means to pass a first of said spaced pulses to said grouping circuit, said contact of said timer being energizable by said first pulse within a fixed time period after initiation of needle movement and being unenergizable thereby after a longer time period, and relay means operable upon energization of said contact to deenergize said pulse grouping circuit to inhibit passage of the second of the pulses thereto.

11. In apparatus for sensing an excessive energization of a movable needle of an electrometer, an electrometer having a needle, a timer having a contact energizable momentarily in the operation of the timer, a pulse grouping circuit operably connected with said contact for the passage of a pulse from said circuit thereto, means responsive to movement of the needle to generate spaced electrical pulses, the time period between which is reflective of the energization of the needle, means to pass a first of said spaced pulses to said grouping circuit, recorder means connected to said pulse grouping circuit actuable by pulses from said grouping circuit, said contact of said timer being energizable by a first of said pulses within a fixed time period after initiation of needle movement and being unenergizable after a longer time period, and relay means operable upon energization of said contact to deenergize said pulse grouping circuit and said recorder means to inhibit passage of the second of the pulses thereto.

12. In apparatus for sensing an excessive energization of a movable needle of an electrometer, an electrometer having a needle, a source of potential, a timer driven from the source of potential, the timer having a contact energizable in the operation of the timer, a pulse grouping circuit operably connected with said contact for the passage of a pulse thereto from said circuit, means responsive to movement of the needle to generate spaced pulses, means to pass a first of said pulses to said grouping circuit, said contact of said timer being energizable by the first of said pulses within a fixed time period after initiation of needle movement and unenergizable thereby after a longer time period, and relay means connected with said source operable upon energization of said contact to deenergize said pulse grouping circuit and to maintain said timer energized.

13. In apparatus for controlling the sensitivity of an electrometer by sensing an excessive energization of the movable needle of the electrometer, an electrometer having a movable needle, means cooperable with the needle in the movement thereof to produce spaced electrical pulses, the time interval between which is reflective of the rate of needle movement, a timer and a pulse grouping circuit operably connected for the passage of a pulse from said circuit to the timer, the pulse grouping circuit being adapted normally to receive the spaced pulses derived from the needle movement, a contact of said timer connected with the pulse grouping circuit and energizable within a fixed time period after initiation of needle movement by a first one of said pulses and unenergizable thereby after a longer time period, relay means operable upon energization of said contact to deenergize said pulse grouping circuit, and means actuable upon said deenergization to change the rate of needle movement.

14. In monitoring apparatus, an electrometer having a needle movable along a path in response to energization, first and second slits spaced apart in an opaque mask removed from the needle, a light source and an objective lens positioned to cast a real image of said needle across said slits when said needle moves, voltage means biasing the needle to one side of said first slit, circuit means including photoelectric cell means and pulse filter means responsive to the passage of the image to generate a sharp pulse at the passage of each slit, a relay which when energized removes the bias from said needle, a source of potential, a timer including a cam shaft having a cam contact momentarily operable to energize said relay from said source of potential to permit the needle to move, recorder means having the action thereof initiated by a first pulse corresponding to the needle image passage of the first slit and terminated by a second pulse corresponding to the needle image passage of the second slit to define a time interval of the image in passing the slits, and a second cam contact on said cam shaft operable to deenergize said relay to return the biasing potential to said needle after second pulse whereby the needle is returned to the side of the first slit.

15. In monitoring apparatus, an electrometer having a needle movable along a path in response to energization, first and second slits spaced apart in an opaque mask removed from the needle, a light source and an objective lens positioned to cast a real image of said needle across said slits when said needle moves, voltage means to bias the needle to an initial position to one side of said first slit and operable to return said needle to said position after movement thereof, circuit means including photoelectric cell means and pulse filter means responsive to the passage of the image to generate a sharp pulse at the passage of each slit, a relay system actuable to receive a first pulse from said circuit means, a source of potential, a timer, including a cam shaft having a cam contact momentarily energizable upon application of said potential to set said timer for receipt of said first pulse, recorder means connected to said relay system and having the operation thereof initiated by said first pulse, said timer having a second cam contact closable within a fixed time period after the first cam contact which second contact is energizable when the time of traverse to the first slit is less than the fixed time period whereby said source of potential is applied to said relay system and recorder to deenergize the same before receipt of a second pulse.

16. In an electrometer scaler, a movable needle, a movable support with a first slit means therein, and means to cast a real image of the needle on the first slit means and other slit means extending transversely through said first slit means for facilitating psitioning of the support.

17. In an electrometer scaler, a movable needle, a movable support with a first slit means therein, means to cast a real image of the needle on the first slit means, and a narrow rectangularly shaped slit extending transversely through and to either side of said first slit means for facilitating positioning of the support.

18. In an electrometer scaler, a movable needle, a movable support with a first slit means therein, means to cast a real image of the needle on the first slit means, and a narrow V-shaped slit extending through and to either side of said first slit means for facilitating positioning of the support and for determining the position of the image of the needle relative to the slit means.

References Cited in the file of this patent

UNITED STATES PATENTS

| Re. 20,476 | Wilson | Aug. 17, 1937 |
| 1,893,421 | Latzko | Jan. 3, 1933 |
| 2,142,378 | Sachtleben | Jan. 3, 1939 |
| 2,368,093 | Asset | Jan. 30, 1945 |
| 2,540,827 | Mankin | Feb. 6, 1951 |